(12) United States Patent
D'Melo et al.

(10) Patent No.: US 12,662,589 B2
(45) Date of Patent: Jun. 23, 2026

(54) ANTI-AGEING ADDITIVES FOR BITUMEN

(71) Applicant: SHELL OIL COMPANY, Houston, TX (US)

(72) Inventors: Dawid John D'Melo, Bangalore (IN); Richard Ernest Taylor, London (GB); Bulent Tugal, London (GB)

(73) Assignee: SHELL USA, INC.

( * ) Notice: Subject to any disclaimer, the term of this patent is extended or adjusted under 35 U.S.C. 154(b) by 605 days.

(21) Appl. No.: 18/004,897

(22) PCT Filed: Jul. 30, 2021

(86) PCT No.: PCT/EP2021/071402
§ 371 (c)(1),
(2) Date: Jan. 10, 2023

(87) PCT Pub. No.: WO2022/023531
PCT Pub. Date: Feb. 3, 2022

(65) Prior Publication Data
US 2023/0303803 A1 Sep. 28, 2023

(30) Foreign Application Priority Data
Jul. 31, 2020 (IN) .............................. 202041032871

(51) Int. Cl.
$C08K\ 5/526$ (2006.01)
$C08K\ 5/1515$ (2006.01)
$C08K\ 5/372$ (2006.01)

(52) U.S. Cl.
CPC ............ $C08K\ 5/526$ (2013.01); $C08K\ 5/1515$ (2013.01); $C08K\ 5/372$ (2013.01); $C08K\ 2201/012$ (2013.01)

(58) Field of Classification Search
None
See application file for complete search history.

(56) References Cited

U.S. PATENT DOCUMENTS 4,321,191 A * 3/1982 Minagawa ............. C08K 5/109
524/285
4,994,508 A 2/1991 Shiraki et al.
(Continued)

FOREIGN PATENT DOCUMENTS

CN 103865196 B 9/2015
CN 103289607 B 11/2015
(Continued)

OTHER PUBLICATIONS

CN 105602175 A (Year: 2016).*
(Continued)

*Primary Examiner* — Joseph D Anthony
(74) *Attorney, Agent, or Firm* — SHELL USA, INC.

(57) ABSTRACT
The invention relates to an additive composition comprising primary anti-oxidants and a secondary anti-oxidant, wherein the primary anti-oxidants are a phenyl phosphite and 3,3'-thiodipropionic acid dioctadecylester, and wherein the secondary anti-oxidant is epoxidized soybean oil. The invention additionally relates a bituminous composition comprising primary anti-oxidants and a secondary anti-oxidant, wherein the primary anti-oxidants are a phenyl phosphite and 3,3'-thiodipropionic acid dioctadecylester; and wherein the secondary anti-oxidant is epoxidized soybean oil. The invention also relates to an asphalt composition comprising the bituminous composition with resistance to short-term and long-term chemical ageing. The invention further relates to the use of an additive composition to reduce short-term and long-term chemical ageing of a bituminous composition.

4 Claims, 4 Drawing Sheets

(56) References Cited

U.S. PATENT DOCUMENTS

| | | | | |
|---|---|---|---|---|
| 7,902,280 | B2 * | 3/2011 | Gelbin | .................. C09K 15/08 |
| | | | | 524/109 |
| 9,926,472 | B2 | 3/2018 | Tan et al. | |
| 10,189,995 | B2 | 1/2019 | Nakajima et al. | |
| 2008/0210126 | A1 | 9/2008 | Apeagyei et al. | |
| 2009/0005478 | A1 * | 1/2009 | Gelbin | ..................... C08K 5/13 |
| | | | | 524/384 |
| 2010/0048782 | A1 * | 2/2010 | Gelbin | .................. C08K 5/526 |
| | | | | 252/182.3 |

FOREIGN PATENT DOCUMENTS

| | | | | | |
|---|---|---|---|---|---|
| CN | 105968837 | A | * | 9/2016 | ............. C08L 95/00 |
| CN | 108059779 | A | | 5/2018 | |
| CN | 110408340 | A | | 11/2019 | |
| JP | 2001192560 | A | | 7/2001 | |
| WO | 2008101809 | A1 | | 8/2008 | |
| WO | 2018230299 | A1 | | 12/2018 | |
| WO | 2019223201 | A1 | | 11/2019 | |

OTHER PUBLICATIONS

CN 102786806 (A) (Year: 2012).*

CN 103804936 (A) (Year: 2014).*

CN 108219488 (A) (Year: 2018).*

CN 108503276 (A) (Year: 2018).*

Office Action Received for United Arab Emirates Application No. P6000178/2023, Mailed on Dec. 17, 2024, 07 Pages(07 Pages of Official Copy).

Office Action Received for Chinese Application No. 202180059395.0 Mailed on Sep. 26, 2024, 18 Pages(10 Pages of English Translation and 8 Pages of Official Copy).

International Search Report and Written Opinion received for PCT Patent Application No. PCT/EP2021/071402, mailed on Nov. 29, 2021, 10 pages.

Sirin et al., "State of the Art Study on Aging of Asphalt Mixtures and Use of Antioxidant Additives", Advances in Civil Engineering, vol. 2018, Mar. 29, 2018, 18 Pages.

Airey, "State of the Art Report on Ageing Test Methods for Bituminous Pavement Materials", International Journal of Pavement Engineering, Sep. 2003, vol. 4, Issue No. 3, pp. 165-176.

* cited by examiner

Change in softening point after RTFOT (%)

Change in softening point after RTFOT (%)

Change in softening point after RTFOT (%)

Increase in G* on aging compared to unaged sample (%)

Increase in G* on aging compared to unaged sample (%)

Increase in G* on aging compared to unaged sample (%)

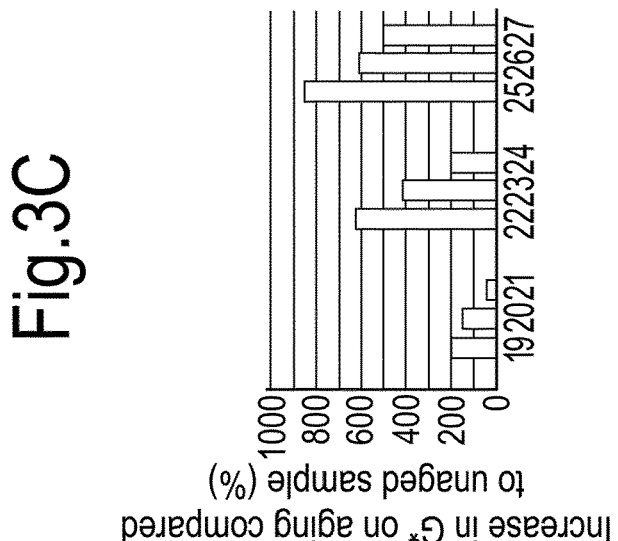
Fig.3C
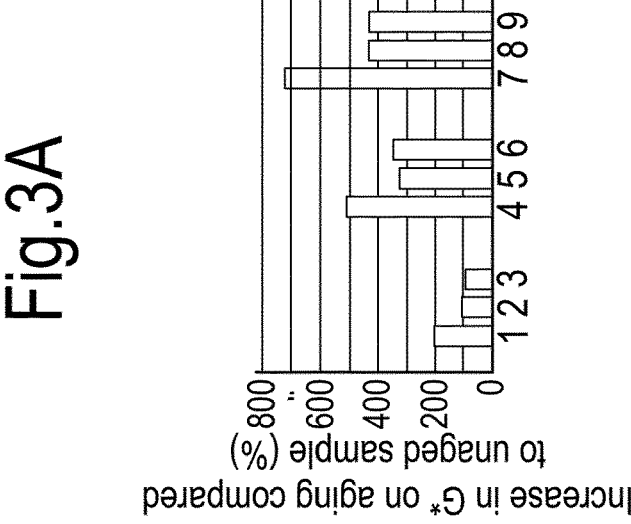
Fig.3B
Fig.3A

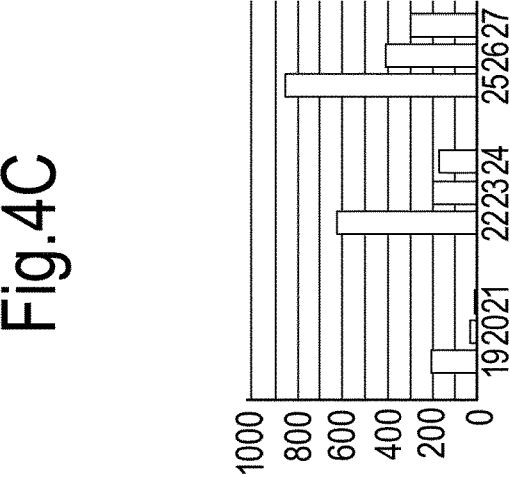
Fig.4C
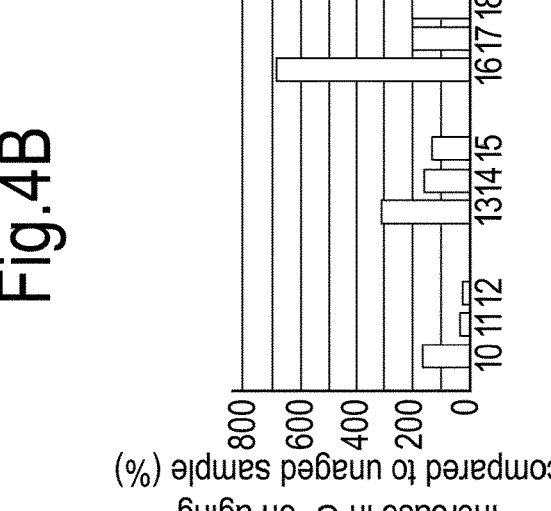
Fig.4B
Fig.4A

ANTI-AGEING ADDITIVES FOR BITUMEN

CROSS REFERENCE TO RELATED APPLICATIONS

This is a National stage application of International Application No. PCT/EP2021/071402, filed 30 Jul. 2021, which claims priority of Indian Application No. 202041032871 filed 31 Jul. 2020 which is incorporated herein by reference in its entirety.

FIELD OF THE INVENTION

The invention relates to an additive composition comprising primary anti-oxidants and a secondary anti-oxidant. The invention additionally relates to a bituminous composition with resistance to short-term and long-term chemical ageing. The invention also relates to an asphalt composition comprising a bituminous composition with resistance to short-term and long-term chemical ageing. The invention further relates to the use of an additive composition to reduce short-term and long-term chemical ageing of a bituminous composition.

BACKGROUND OF THE INVENTION

Bitumen is a tarlike mixture of hydrocarbons, which may occur naturally, or may be a petroleum/crude oil distillation product. Depending on the temperature that it is exposed to, it may be a viscous liquid, or a solid, and it softens gradually when heated.

Bitumen is a complex mixture, comprising organic molecules such as aliphatic and aromatic derivatives. Bitumen also comprises trace amounts of metals such as nickel, vanadium and iron among other metals. These are typically present in the bitumen as metallic salts, oxides or in porphyrin structures. The interactions between its constituent molecules confer to a given batch of bitumen its unique properties, and consequently how it behaves under different conditions that the bitumen may be subjected to. The composition of different bitumen batches vary depending on at least the source of petroleum/crude oil used to produce it, as well as the chemical modifications that it has been subjected to during its manufacture.

One way of differentiating between different bitumens is by their saturate, aromatic, resin and asphaltene content (referred in the art as "SARA"). Mixing bitumen with n-heptane leads to a heptane-soluble fraction that comprises 'maltenes', and a heptane-insoluble fraction that comprises 'asphaltenes'. The maltene fraction contains the saturates, aromatics and resin portions of bitumen. Depending on its petroleum/crude oil source and the chemical modifications that a batch of bitumen has gone through during its manufacture, the proportions of these fractions with respect to each other vary.

Bitumen can be regarded as a colloidal system, consisting of asphaltene micelles dispersed or dissolved in a maltene matrix. When so-called 'peptised', asphaltenes tend to be more dispersed in the maltene matrix. Lesser peptised asphaltenes may associate with one another to form open packed structures of linked micelles. Due to at least such structural behaviour, the degree to which the asphaltenes are peptised affects the viscosity of the bitumen, and therefore the bitumen's physical behaviour.

Bitumen may be used as a binder in a variety of applications. For example, it may be combined with aggregate to make asphalt for producing paved roads. Alternatively, bitumen may be used in so-called industrial applications such as roofing, flooring or sealing.

During asphalt production, molten bitumen or a molten bituminous composition is mixed with hot aggregates such that a film of bitumen coats the aggregates to form a hot asphalt mixture. The hot asphalt mixture is then transported to the paving site where it is uniformly applied over a surface and compacted to a desired level to produce the pavement.

The coating of aggregates with bitumen increases the surface area to volume ratio of the bitumen, which in turn increases its exposure to external factors, such as air, making it more susceptible to oxidation. Such an oxidation process is referred to as "short-term ageing" or "short-term chemical ageing", and is exacerbated by the elevated temperature of the asphalt mixture.

During the service life of an installed pavement, its bitumen is subjected to further oxidation, a process referred to as "long-term ageing" or "long-term chemical ageing". Compared to short-term ageing, long-term ageing occurs at lower temperatures, and over longer periods.

It has been established that the 'Rolling Thin Film Oven Test' ("RTFOT"), and the 'Thin Film Oven Test' ("TFOT") are suitable laboratory protocols that simulate short-term ageing. However, they are not suitable for simulating long-term ageing. Instead, long-term ageing may be simulated in the laboratory by 'Pressure Ageing Vessel' ("PAV"), a process that gives an indication of how a bitumen under investigation may be affected by about 5 years' of long-term-ageing per cycle of PAV treatment. All such techniques will be familiar to a person skilled in the art, and are in any case described in the "Shell Bitumen Handbook", sixth edition, 2015, ISBN 978-0-7277-5837-8, and are reviewed by G. D. Airey in "Bituminous Pavement Materials", International Journal of Pavement Engineering 4(3):165-176, September 2003.

Both short- and long-term ageing increase stiffness of a pavement beyond what it was intended or designed to be. This can result in premature failure of the pavement arising from fatigue failure, ravelling or potentially higher crack propagation, leading to catastrophic pavement failure. A deferment of these defects will increase the service life of the pavement and lower its maintenance and remediation costs.

The actual way bitumen oxidation proceeds is not fully understood. However, without being bound to any particular theory, it is thought that oxidation primarily increases the level of free radicals in bitumen. The generated free radicals in turn react other bitumen constituents leading to the formation of oxidation by-products that have, for example, polar groups such as ketones, sulphoxides, acid anhydrides and carboxyl. These by-products in turn interact with various other bitumen constituents, leading to a bitumen with substantially different properties, such as but not limited to, increased stiffness.

One way of reducing the adverse effects of bitumen oxidation may be by incorporating into bitumen anti-oxidants.

"Anti-oxidants" is a general term used to describe a range of compounds with functional groups such as, but not limited to, phenols, amines, phosphites, thioesters and thioalkane. Such functional groups can react with the primary products of bitumen oxidation, such as but not limited to free radicals, and reduce their ability to change properties of bitumens. This type of anti-oxidants are referred to herein as "primary anti-oxidants". Examples of this type of antioxidants include, but not limited to, tris (2,4-ditert butyl) phenyl phosphite, tris phenyl phosphite and 3,3'-thiodipropionic acid dioctadecylester.

A further group of compounds that contain, for example oxirane/epoxy groups in particular, can react with the by-products of bitumen oxidation that the primary products of bitumen oxidation produce, and reduce their adverse effects. This type of anti-oxidants are referred to herein as "secondary anti-oxidants". An examples of this type of anti-oxidant is epoxidized soybean oil.

Anti-oxidants may be incorporated into bituminous composition, for example, JP2001192560 discloses a block co-polymer-modified asphalt composition with reduced polymer melting time and improved processability. The asphalt composition may include anti-oxidants and stabilizers. The anti-oxidant may be phenol-based anti-oxidant, sulfur-based anti-oxidant, amine-based anti-oxidant, quinoline-based anti-oxidant, phosphorus-based anti-oxidant or the like. An example of the sulfur-based anti-oxidant may be distearylthiodipropionate, and examples of the phosphorus anti-oxidant may be triphenyl phosphite, tris (nonylphenyl) phosphite, tris (2-ethylhexyl) phosphite or tris (2,4-t-di-t-butylphenyl) phosphite.

U.S. Pat. No. 4,994,508 and EP0299499A2 discloses a composition comprising: (a) a hydrogenated block co-polymer (as described therein); and (b) at least one thermoplastic substance selected from: (i) tackifier resins, (ii) thermoplastic resins, and (iii) bituminous material. The composition may contain tris(2,4-di-tert-butylphenyl) phosphite and distearyl-3,3'-thiodipropionic acid ester.

The present inventors have sought to find additives, in particular anti-oxidants, which are effective in bituminous compositions by providing to them resistance to short- and long-term chemical ageing. However, they have found that not every anti-oxidant is effective in reducing ageing of every bituminous composition. In particular the inventors have determined that even for those anti-oxidants that appear to be effective in reducing bitumen ageing, the level of their effect is not the same in different bitumens, and may even be non-effective in some bitumens.

In seeking to provide resistance to short- and long-term chemical ageing to bituminous compositions irrespective of their origin and the process(es) by which they were manufactured, the inventors sought to determine whether a combination of anti-oxidants may contribute to reducing short- and long-term chemical ageing of bitumens/bituminous compositions irrespective of the origin of the bitumen(s) that comprise the bituminous composition, and irrespective of the chemical processing that the constituent bitumen(s) went through during their manufacture.

SUMMARY OF THE INVENTION

Accordingly, the present invention concerns an additive composition comprising primary anti-oxidants and a secondary anti-oxidant, wherein the primary anti-oxidants are a phenyl phosphite and 3,3'-thiodipropionic acid dioctadecylester, and wherein the secondary anti-oxidant is epoxidized soybean oil.

The present invention additionally concerns a bituminous composition comprising primary anti-oxidants and a secondary anti-oxidant, wherein the primary anti-oxidants are a phenyl phosphite and 3,3'-thiodipropionic acid dioctadecylester, and wherein the secondary anti-oxidant is epoxidized soybean oil.

The present invention also concerns an asphalt composition comprising primary anti-oxidants and a secondary antioxidant, wherein the primary anti-oxidants are a phenyl phosphite and 3,3'-thiodipropionic acid dioctadecylester, and wherein the secondary anti-oxidant is epoxidized soybean oil.

The present invention further concerns the use of an additive composition to reduce short- and long-term ageing of a bituminous composition, wherein the additive composition comprises primary anti-oxidants and a secondary anti-oxidant, wherein the primary anti-oxidants are a phenyl phosphite and 3,3'-thiodipropionic acid dioctadecylester, and wherein the secondary anti-oxidant is epoxidized soybean oil.

BRIEF DESCRIPTION OF THE DRAWINGS

FIG. 3 illustrates the levels of resistance to short- and long-term ageing of a bituminous composition comprising the additive composition according the present invention used at a lower concentration that shown in FIG. 4.

FIG. 4 illustrates the levels of resistance to short- and long-term ageing of a bituminous composition comprising the additive composition according the present invention, used at a higher concentration that shown in FIG. 3.

DETAILED DESCRIPTION OF THE INVENTION

Figure 1A:
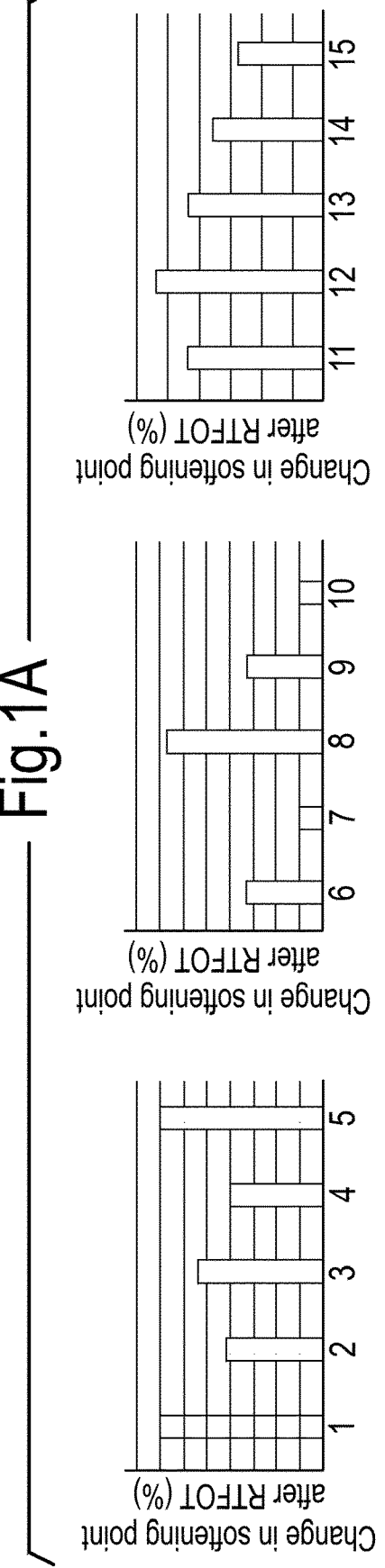
FIG. 1 illustrates the variability in the levels of resistance to short-term ageing of different bitumens provided to them by different individual additives.

Bitumen is a complex mixture of hydrocarbons and their derivatives, which may occur naturally, or may be a petroleum/crude oil distillation product. Depending on its source, at ambient temperatures bitumen can be a viscous liquid or a solid. Its physical state softens gradually when heated, making it a useful material, especially for construction applications. Bitumen as a construction material is generally a petroleum/crude oil distillation product, thereby having specific reproduceable physical and chemical properties. Bitumen is used as a binder in a variety of applications ranging from roofing, flooring to sealing. Bitumen may be combined with aggregates to provide asphalt that can be used for, for example, manufacturing roads and airport runways.

The inventors have sought to provide to bituminous compositions resistance to short- and long-term chemical ageing, irrespective of, for example, the bituminous composition's origin and the process(es) by which it was manufactured. In particular, they sought to formulate a universally effective additive composition package whose such anti-ageing effects provided to the bituminous composition is less prone to variability due to the components of the bituminous composition, the bitumen's origin and the process(es) by which it was manufactured, so that such an additive composition package can be incorporated into any bituminous composition and provide to it an acceptable level of resistance to short- and long-term bitumen ageing, for example, during and after being incorporated into asphalt compositions.

The present invention provides an additive composition comprising primary anti-oxidants and a secondary anti-oxidant, wherein the primary anti-oxidants are a phenyl phosphite and 3,3'-thiodipropionic acid dioctadecylester; and wherein the secondary anti-oxidant is epoxidized soybean oil.

The primary anti-oxidants comprising the additive composition according to the present invention are a phenyl phosphite and 3,3'-thiodipropionic acid dioctadecylester.

The phenyl phosphite may be selected from tris (2,4-ditert butyl) phenyl phosphite and tris phenyl phosphite.

Tris (2,4-ditert butyl) phenyl phosphite and tris phenyl phosphite are thought to react with the primary products of bitumen oxidation, such as but not limited to free radicals, and reduce their ability to change properties of bitumens. As such, they can be regarded as a type of primary anti-oxidant, as discussed above, and can be used as anti-oxidant additives.

The 3,3'-thiodipropionic acid dioctadecylester may also be referred to as, for example, "propanoic acid 3,3'-thiobis-dioctadecyl ester", "distearyl thiodipropionate", "dioctadecyl 3,3'-thiodipropionate" and/or "octadecyl 3-(3-octadecoxy-3-oxopropyl) sulfanylpropanoate". In any event, 3,3'-thiodipropionic acid dioctadecylester may be commercially available under the trade name of "Irganox PS802FL"™. As with tris (2,4-ditert butyl) phenyl phosphite and tris phenyl phosphite, 3,3'-thiodipropionic acid dioctadecylester may also be regarded as a primary anti-oxidant, as discussed above.

It is thought that epoxidized soybean oil can react with the by-products of bitumen oxidation produced by, for example, free radicals, and reduce the by-products' adverse effects. As such, epoxidized soybean oil can be regarded as a type of secondary anti-oxidant, as discussed above.

The inventors have found that the primary anti-oxidant additives tris (2,4-ditert butyl) phenyl phosphite and tris phenyl phosphite each by itself provided to a number of single source bituminous compositions resistance to short- and long-term chemical ageing.

Similarly, 3,3'-thiodipropionic acid dioctadecylester and epoxidized soybean oil each by itself provided to a number of single source bituminous compositions resistance to short- and long-term chemical ageing.

However, the inventors unexpectedly found that when they combined tris (2,4-ditert butyl) phenyl phosphite or tris phenyl phosphite with 3,3'-thiodipropionic acid dioctadecylester and epoxidized soybean oil, the resistance to short- and long-term chemical ageing conferred to bituminous compositions became less prone to variability due to, for example, the components of the bituminous composition, its origin and the process(es) by which it was manufactured.

The inventors found that the extent of the anti-ageing effect provided by said combinations of anti-oxidants could be less than the extent conferred by some individual anti-oxidants, however said combinations reduced the variability in anti-ageing seen across different bitumens, thus making the said combination more widely effective.

As such, one embodiment of the additive composition according to the present invention may comprise tris (2,4-ditert butyl) phenyl phosphite, 3,3'-thiodipropionic acid dioctadecylester and epoxidized soybean oil, and another embodiment may comprise tris phenyl phosphite, 3,3'-thiodipropionic acid dioctadecylester and epoxidized soybean oil.

The additive composition can be in the form of a pre-mixed concentrated masterbatch or an additive composition package, to be diluted into a bituminous composition, for example, to reduce short- and long-term ageing of bituminous compositions, as described below.

The present invention additionally provides a bituminous composition comprising primary anti-oxidants and a secondary anti-oxidant.

The bituminous composition comprises bitumen. Bitumen may be a by-product of petroleum/crude oil refining, as a natural product, or mixtures thereof. The bitumen may be straight run bitumen, thermally cracked residue or precipitation bitumen, e.g. from propane de-asphalting process. The bituminous composition may also be a blend of more than one bitumen. The bituminous composition may comprise a natural rubber or crumb rubber modified binder, a penetration grade binder, and/or may comprise polymers, waxes and/or surfactants.

The bituminous composition according to the present invention can be used for asphalt production, as well as for industrial applications such as roofing, flooring or sealing. Accordingly, an asphalt composition comprising the bituminous composition can be used for road paving applications.

The primary anti-oxidants comprising the bituminous composition according to the present invention are a phenyl phosphite and 3,3'-thiodipropionic acid dioctadecylester.

The phenyl phosphite may be selected from tris (2,4-ditert butyl) phenyl phosphite and tris phenyl phosphite.

Tris (2,4-ditert butyl) phenyl phosphite and tris phenyl phosphite are each regarded as a type of primary anti-oxidant, as discussed above.

The 3,3'-thiodipropionic acid dioctadecylester may also be referred to as, for example, "propanoic acid 3,3'-thiobis-dioctadecyl ester", "distearyl thiodipropionate", "dioctadecyl 3,3'-thiodipropionate" and/or "octadecyl 3-(3-octadecoxy-3-oxopropyl) sulfanylpropanoate". In any event, 3,3'-thiodipropionic acid dioctadecylester may be commercially available under the trade name of "Irganox PS802FL"™. As with tris (2,4-ditert butyl) phenyl phosphite and tris phenyl phosphite, 3,3'-thiodipropionic acid dioctadecylester may also be regarded as a primary anti-oxidant, as discussed above.

It is thought that epoxidized soybean oil can react with the by-products of bitumen oxidation produced by, for example, free radicals, and reduce the by-products' adverse effects. As such, epoxidized soybean oil can be regarded as a type of secondary anti-oxidant, as discussed above.

The inventors have found that the primary anti-oxidant additives tris (2,4-ditert butyl) phenyl phosphite and tris phenyl phosphite each by itself provided to a number of single source bituminous compositions resistance to short- and long-term chemical ageing.

Similarly, 3,3'-thiodipropionic acid dioctadecylester and epoxidized soybean oil each by itself provided to a number of single source bituminous compositions resistance to short- and long-term chemical ageing.

However, the inventors unexpectedly found that when they are combined tris (2,4-ditert butyl) phenyl phosphite or tris phenyl phosphite with 3,3'-thiodipropionic acid dioctadecylester and epoxidized soybean oil, the resistance to short- and long-term chemical ageing conferred to bituminous compositions became less prone to variability due to, for example, the components of the bituminous composition, its origin and the process(es) by which it was manufactured.

The inventors found that the extent of the anti-ageing effect provided by said combinations of anti-oxidants could be less than the extent conferred by some individual anti-oxidants, however said combinations reduced the variability in anti-ageing seen across different bitumens, thus making the said combination more widely effective.

As such, one embodiment of the bituminous composition according to the present invention may comprise tris (2,4-ditert butyl) phenyl phosphite, 3,3'-thiodipropionic acid dioctadecylester and epoxidized soybean oil, and another embodiment may comprise tris phenyl phosphite, 3,3'-thiodipropionic acid dioctadecylester and epoxidized soybean oil The amount of each one of the above-mentioned anti-oxidants in the bituminous composition in relation to the weight of the bituminous composition is at least 0.05% w/w, preferably at least 0.15% w/w, more preferably at least 0.2% w/w, even more preferably at least 0.25% w/w, most preferably at least 0.3% w/w.

The amount of each one of the above-mentioned anti-oxidants in the bituminous composition in relation to the weight of the bituminous composition is at most 2% w/w, preferably at most 1.75% w/w, more preferably at most 1.5% w/w, even more preferably at most 1.25% w/w, most preferably at most 1% w/w.

Each one of the above-mentioned anti-oxidants may be incorporated into the bituminous composition in a different amount to the others, as long as each one is at an amount that falls within the concentration ranges described above.

Each one of the above-mentioned anti-oxidants may be incorporated into the bituminous composition by any method known to the person skilled in the art, for example by any low shear mixing method. Preferably, the anti-oxidants are incorporated into the bituminous composition so that they are almost homogeneously dispersed, or more preferably, the anti-oxidants are incorporated into the bituminous composition so that they are homogeneously dispersed.

Each one of the above-mentioned anti-oxidants, whether individually or together in any combination, may be pre-dissolved in, for example, but not limited to, a petroleum flux, and then incorporated into the bituminous composition by diluting it to a required concentration as described below.

The above-mentioned anti-oxidants are incorporated into molten bituminous composition, for example at a temperature of at least 140° C., or above.

The primary anti-oxidants and the secondary anti-oxidant may be mixed together prior to their incorporation into the bituminous composition to form a pre-mixed concentrated masterbatch, or additive composition package, which may be incorporated into the bituminous composition by diluting it to a required concentration that falls within the range described above, such that the final amount/concentration of each one of the components (i.e. the primary anti-oxidants and the secondary anti-oxidant) in the bituminous composition is within the concentration ranges described above.

The amount/concentration in the pre-mixed concentrated masterbatch or additive composition package of each of the anti-oxidants with respect to each other may vary as long as, once the pre-mixed concentrated masterbatch or additive composition package diluted into the bituminous composition, their individual amounts/concentrations fall within the concentration ranges described above for the bituminous composition.

Tris (2,4-ditert butyl) phenyl phosphite and 3,3'-thiodipropionic acid dioctadecylester are normally procured as solids, and epoxidized soya bean oil, trisphenyl phosphite are liquids.

The pre-mixed concentrated masterbatch or additive composition package may comprise for example, but not limited to, a petroleum flux, to assist preparation of the pre-mixed concentrated masterbatch or additive composition package, as well as the incorporations of the anti-oxidants into the bituminous composition.

The present invention also relates to an asphalt composition comprising a bituminous composition with resistance to short-term and long-term chemical ageing. The bituminous composition comprising the asphalt composition comprises primary anti-oxidants and a secondary anti-oxidant, wherein the primary anti-oxidants are a phenyl phosphite and 3,3'-thiodipropionic acid dioctadecylester, and wherein the secondary anti-oxidant is epoxidized soybean oil.

The term 'asphalt' as used herein refers to a mixture comprising bitumen or a bituminous composition, and aggregates for the purpose of paving roads. During asphalt production, molten bitumen/bituminous composition is mixed with hot aggregates such that a thin film of the bitumen/bituminous composition coats the aggregates. The hot asphalt mixture is then transported to the paving site where it is uniformly applied over a surface and compacted to a desired level to produce the pavement.

The asphalt composition may comprise a natural rubber or crumb rubber modified bituminous composition, a penetration grade bituminous composition, and/or a bituminous composition comprising polymers, waxes and/or surfactants.

One embodiment of the asphalt composition according to the present invention may comprise tris (2,4-ditert butyl) phenyl phosphite, 3,3'-thiodipropionic acid dioctadecylester and epoxidized soybean oil, and another embodiment may comprise tris phenyl phosphite, 3,3'-thiodipropionic acid dioctadecylester and epoxidized soybean oil.

The amount of each one of the above-mentioned anti-oxidants in the bituminous composition in relation to the weight of the bituminous composition is at least 0.05% w/w, preferably at least 0.15% w/w, more preferably at least 0.2% w/w, even more preferably at least 0.25% w/w, most preferably at least 0.3% w/w.

The amount of each one of the above-mentioned anti-oxidants in the bituminous composition in relation to the weight of the bituminous composition is at most 2% w/w, preferably at most 1.75% w/w, more preferably at most 1.5% w/w, even more preferably at most 1.25% w/w, most preferably at most 1% w/w.

The amount of the above-mentioned anti-oxidants comprising the asphalt composition are each considered with respect to their concentration in the bitumen/bituminous composition comprising the asphalt composition, in such amount that each one is at an amount/concentration that falls within the concentration ranges described above for the bituminous composition.

The amount of each of the anti-oxidants with respect to each other may vary as long as their amount/concentration falls within the concentration ranges described above.

Each one of the above-mentioned anti-oxidants may be incorporated into the asphalt composition by first incorporating them into the bituminous composition that comprises the asphalt composition, by any method known to the person skilled in the art, for example by any low shear mixing method.

Preferably, the anti-oxidants are incorporated into the bituminous composition so that they are almost homogeneously dispersed, or more preferably, the anti-oxidants are incorporated into the bituminous composition so that they are homogeneously dispersed.

The above-mentioned anti-oxidants are incorporated into molten bituminous composition, for example at a temperature of at least 140° C., or above.

If the primary anti-oxidants and the secondary anti-oxidant are present in the form of a pre-mixed concentrated masterbatch/additive composition package, such mixture may also be incorporated into the bituminous composition that comprises the asphalt composition in a similar manner, such that their individual amounts/concentrations are within the concentration ranges described above.

The present invention further concerns the use of an additive composition to reduce short- and long-term ageing of a bituminous composition, wherein the additive composition comprises primary anti-oxidants and a secondary anti-oxidant.

The primary anti-oxidants are a phenyl phosphite and 3,3'-thiodipropionic acid dioctadecylester.

The phenyl phosphite may be selected from tris (2,4-ditert butyl) phenyl phosphite or tris phenyl phosphite.

The secondary anti-oxidant is epoxidized soybean oil.

One embodiment of the additive composition according to the present invention may comprise tris (2,4-ditert butyl) phenyl phosphite, 3,3'-thiodipropionic acid dioctadecylester and epoxidized soybean oil, and another embodiment may comprise tris phenyl phosphite, 3,3'-thiodipropionic acid dioctadecylester and epoxidized soybean oil.

The bituminous composition comprises bitumen. Bitumen may be a by-product of petroleum/crude oil refining, as a natural product, or mixtures thereof. The bitumen may be straight run bitumen, thermally cracked residue or precipitation bitumen, e.g. from propane de-asphalting process. The bituminous composition may also be a blend of more than one bitumen. The bituminous composition may comprise a natural rubber or crumb rubber modified binder, a penetration grade binder, and/or may comprise polymers, waxes and/or surfactants.

The bituminous composition according to the present invention can be used for asphalt production, as well as for industrial applications such as roofing, flooring or sealing. Accordingly, an asphalt composition comprising the bituminous composition can be used for road paving applications.

The additive composition is used to reduce short- and long-term ageing of the bituminous compositions by incorporating the additive composition into the bituminous composition such that when incorporated, the final amount in relation to the weight of the bituminous composition of each of the primary anti-oxidants and the secondary anti-oxidant in the bituminous composition is at least 0.05% w/w, preferably at least 0.15% w/w, more preferably at least 0.2% w/w, even more preferably at least 0.25% w/w, most preferably at least 0.3% w/w. When the additive composition is incorporated into the bituminous composition, the amount of each one the primary anti-oxidants and the secondary anti-oxidant in the bituminous composition in relation to the weight of the bituminous composition is at most 2% w/w, preferably at most 1.75% w/w, more preferably at most 1.5% w/w, even more preferably at most 1.25% w/w, most preferably at most 1% w/w.

The amount/concentration of each of the primary anti-oxidants and the secondary anti-oxidant with respect to each other may vary as long as, when the additive composition is incorporated into the bituminous composition, their amount/concentrations is within the concentration range described above.

The additive composition can be incorporated into molten bituminous composition by any method known to the person skilled in the art, for example by any low shear mixing method. Preferably, the additive composition is incorporated into the bituminous composition so that it is almost homogeneously dispersed throughout the bituminous composition, more preferably, it is incorporated into the bituminous composition so that it is homogeneously dispersed throughout the bituminous composition.

If the anti-oxidants are present in the form of a pre-mixed concentrated masterbatch/additive composition package, as described above, such mixture may also be incorporated into the bituminous composition in a similar manner, such that their individual amounts/concentrations are within the ranges described above.

The additive composition can be incorporated into molten bituminous composition, for example, at a temperature of at least 140° C., or above.

DETAILED DESCRIPTION OF THE DRAWINGS

FIG. 1 illustrates the variability in the levels of resistance to short-term ageing of different bitumens provided to them by different individual additives.

FIG. 2 illustrates the extent of resistance to short-term ageing of different bitumens provided to them by the additive composition according the present invention.

FIG. 3 illustrates the extent of resistance to short- and long-term ageing of a bitumen comprising the additive composition according the present invention, at a total concentration of 0.6% w/w.

FIG. 4 illustrates the extent of resistance to short and long-term ageing of a bitumen comprising the additive composition according to the present invention, at a total concentration of 1.5% w/w.

EXAMPLES

The invention will now be described by reference to examples which are not intended to be limiting of the invention.

Rolling Thin Film Oven Test ("RTFOT") was used to simulate short-term ageing in bituminous samples, and was carried out in accordance with American Society for Testing and Materials (ASTM) method 'ASTM D2872'.

Pressure Ageing Vessel ("PAV") was used to simulate long-term-ageing in bituminous samples, and was carried out in accordance with ASTM method 'ASTM D6521'.

To assess the extent of ageing in bituminous samples, the softening point in ° C. and complex shear modulus in Pa of each bituminous sample with additive(s) were tested before, and after, being subjected to RTFOT or PAV, and the difference in their softening points were calculated. Such value for each sample was subtracted from the difference in softening point of the same bituminous sample without any additive(s) to provide the "reduction in difference in softening point after ageing", wherein the samples with the highest reduction indicated those samples that comprised the additive(s) that were more effective in providing resistance to ageing. The samples when subjected to similar ageing conditions with a lower complex shear modulus are preferred. Samples with a lower complex shear modulus after being subjected to similar ageing conditions indicate those samples comprising the additive(s) that were more effective in providing resistance to ageing.

Example 1

The extent to which individual the anti-oxidants of the present inventions are able to reduce short-term ageing was assessed on different bituminous compositions from different origins, each comprising a single-origin bitumen.

The following additives were used: tris (2,4-ditert butyl) phenyl phosphite, tris phenyl phosphite, 3,3'-thiodipropionic acid dioctadecylester and epoxidized soybean oil.

To individual 200 ml samples of bitumen from the above-mentioned sources, 0.6% w/w of tris (2,4-ditert butyl) phenyl phosphite, 0.6% w/w of tris phenyl phosphite, 0.6% w/w of 3,3'-thiodipropionic acid dioctadecylester (Irganox FL 802), or 0.6% w/w of epoxidized soybean oil, were added and mixed to almost homogeneity. One sample from each bitumen source was reserved as a negative control, having no additive(s) added to it.

Softening point and Complex shear modulus (G*) of each sample was measured as described above, and the reduction in difference in softening point after ageing was worked out. The complex shear modulus is a rheological parameter used to describes the entire viscoelastic behavior of the sample. The results are set out in Table 1, and displayed in FIG. 1.

Table 1 shows the effect of individual antioxidants on the change in softening point and G* of bitumen samples after RTFOT.

FIG. 1 shows the variability of the extent to which each additive was effective in proving resistance to short-term ageing.

FIG. 1A y-axis shows the change in softening point after RTFOT in ° C.: Columns 1-5 using Bitumen Sample 1; Columns 6-10 using Bitumen Sample 2; Columns 11-15 using Bitumen Sample 3.

Figure 1B:
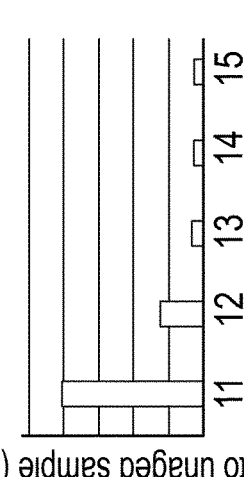
Figure 1B:
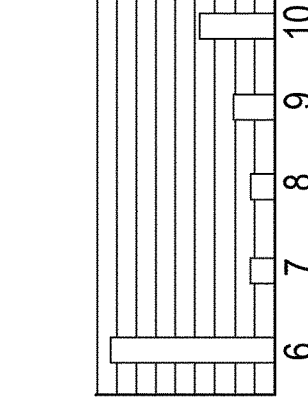
Figure 1B:
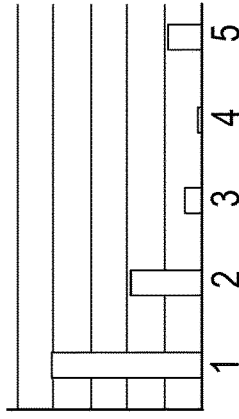

FIG. 1B y-axis shows the increase in G* on ageing compared to unaged sample: Columns 1-5 using Bitumen Sample 1; Columns 6-10 using Bitumen Sample 2; Columns 11-15 using Bitumen Sample 3.

In both FIGS. 1A and 1B, Columns 1, 6 and 11 are the control samples without any anti-oxidant; Columns 2, 7 and 12 comprise tris (2,4-ditert butyl) phenyl phosphite; Columns 3, 8 and 13 comprise 3,3'-thiodipropionic acid dioctadecylester (Irganox FL 802); Columns 4, 9 and 14 comprise epoxidized soybean oil; and Columns 5, 10 and 15 comprise tris phenyl phosphite.

The results show that the extent to which each one of said antioxidants individually affects the different bitumen samples to different extents, without any consistency between the bitumens.

Example 2

The extent of the resistance to short-term ageing of the bituminous composition according to the present invention was assessed on three different bituminous compositions each comprising a single-origin bitumen from different origins, each further comprising either tris (2,4-ditert butyl) phenyl phosphite, 3,3'-thiodipropionic acid dioctadecylester (Irganox FL 802) and epoxidized soybean oil ("Additive Composition 1"; each additive at an amount of 0.2% w/w in 200 ml bitumen mixed to almost homogeneity), or tris phenyl phosphite, 3,3'-thiodipropionic acid dioctadecylester (Irganox FL 802) and epoxidized soybean oil ("Additive Composition 2"; each additive at an amount of 0.2% w/w in 200 ml bitumen mixed to almost homogeneity).

The effect of these samples were compared to effect of each individual additive on the bitumen of the same origin. RTFOT was carried out as in Example 1 (according to ASTM D2872), and the reduction in difference in softening point after ageing in ° C. was calculated as in Example 1.

The results are set out in Table 2, and displayed in FIG. 2.

Table 2 shows the comparison of additive compositions on the change of softening point and G* after RTFOT.

FIG. 2 shows that the variability in the anti-ageing effects observed with the individual additives was no longer as prominent when Additive Composition 1 or Additive Composition 2 were added to the each of the Bitumen Samples 1, 2 and 3.

Figures 2A, 2B:
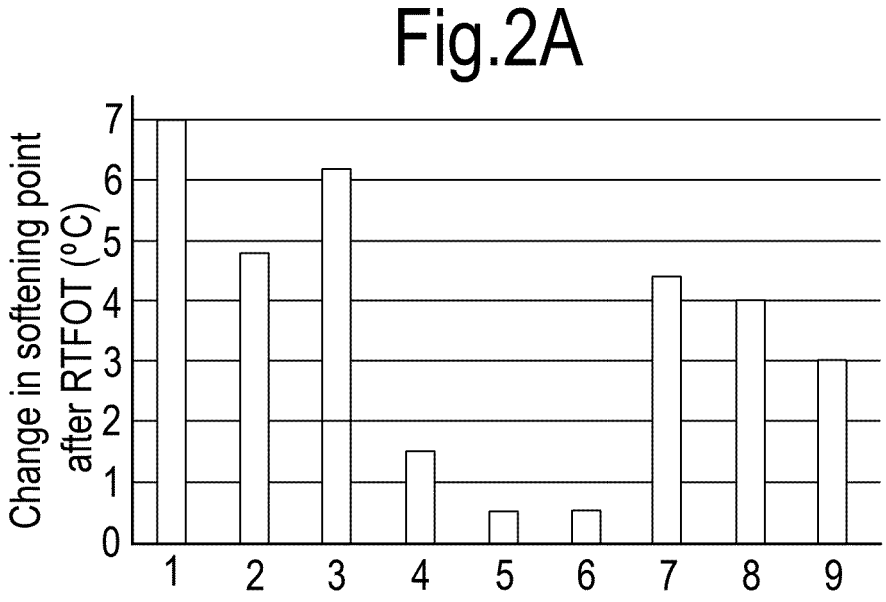
FIG. 2 illustrates the levels of resistance to short-term ageing of different bituminous compositions provided to them by the additive composition according the present invention.

FIG. 2A y-axis shows the change in softening point after RTFOT in ° C.: Column 1 using Bitumen Sample 1 only without any Additive Composition; Column 4 using Bitumen Sample 2 only without any Additive Composition; and Column 7 using Bitumen Sample 3 only without any Additive Composition.

FIG. 2B y-axis shows the increase in G* on ageing compared to unaged sample Column 10 using Bitumen Sample 1 only without any Additive Composition; Column 13 using Bitumen Sample 2 only without any Additive Composition; Column 16 using Bitumen Sample 3 only without any Additive Composition.

Regarding FIGS. 2A and 2B, Columns 2, 5, 8, 11, 14 and 17 comprise the Additive Composition 1.

Regarding FIGS. 2A and 2B, Columns 3, 6, 9, 12, 15 and 18 comprise the Additive Composition 2.

The results show a consistent decrease in the extent of ageing, after being subjected to short-term ageing by RTFOT, in compositions which comprised the Additive Composition, compared to the Bitumen Samples 1-3 without any Additive Composition. This was reflected in both the change in softening point after RTFOT and the increase in G* after short-term ageing.

Example 3

The extent of the resistance to short- and long-term ageing of the bituminous composition according to the present invention were assessed.

To bituminous samples, either: (i) tris (2,4-ditert butyl) phenyl phosphite, 3,3'-thiodipropionic acid dioctadecylester (Irganox FL 802) and epoxidized soybean oil ("Additive Composition 1"; each additive at an amount of 0.2% w/w (total 0.6% w/w) in 200 ml bitumen mixed to almost homogeneity); or (ii) tris phenyl phosphite, 3,3'-thiodipropionic acid dioctadecylester (Irganox FL 802) and epoxidized soybean oil ("Additive Composition 2"; each additive at an amount of 0.2% w/w (total 0.6% w/w) in 200 ml bitumen mixed to almost homogeneity). To another sample of the same bitumen, no additives were added. Each bitumen sample was subjected to an RTFOT cycle followed by two cycles of PAV. Samples were taken from each bitumen sample before ageing, after the RTFOT, after the first cycle of PAV and after the second cycle of PAV, and measured and calculated.

Each cycle of PAV was carried out at 100° C. for 20 hours at 21 atm., using zero air, as outlined in ASTM D6521.

Table 3 shows the comparison of Additive Compositions 1 and 2 on the change of G* after RTFOT, and PAV cycles.

FIG. 3 shows extent of the resistance to short-term (RTFOT) and long-term (PAV) ageing of the bituminous composition according to the present invention.

FIG. 3A shows the Bitumen Sample 1 results; FIG. 3B shows the Bitumen Sample 2 results; and FIG. 3A shows the Bitumen Sample 3 results.

In FIGS. 3A, 3B and 3C, Columns 1, 4, 7, 10, 13 16, 19, 22 and 25 are the control bitumen samples without any Additive Composition; Columns 2, 5, 8, 11, 14, 17, 20, 23 and 26 comprise Additive Composition 1; and Columns 3, 6, 9, 12, 15, 18, 21, 24 and 27 comprise Additive Composition 2.

In each of FIGS. 3A, 3B and 3C, the lefthand three columns (1, 2, 3, 10, 11, 12, 19, 20 and 21) display the short-term ageing data (RTFOT data); the middle three columns (4, 5, 6, 13, 14, 15, 22, 23 and 24) display the long-term ageing data after 1 cycle of PAV; and righthand three columns (7, 8, 9, 16, 17, 18, 25, 26 and 27) display the long-term ageing data after 2 cycles of PAV.

FIG. 3 summarises the consistent effect of the Additive Compositions 1 and 2 in reducing both short- and long-term ageing in bitumen samples of different origin.

The consistently lower G* was observed for Bitumen Samples 1-3 containing the Additive Compositions after being subjected to short- and long-term ageing, compared to the Bitumen Samples without any Additive Compositions. This demonstrated the consistent effect of the Additive Composition in controlling the extent of ageing regardless of ageing type of time.

Example 4

The extent of the resistance to short- and long-term ageing of the bituminous composition at higher anti-oxidant composition concentrations according to the present invention were assessed.

The same protocol as in Example 3 was performed on the same samples as in Example 3, however, the total Additive Composition 1 and 2 were each increased to 1.5% w/w (i.e. 0.5% w/w of each constituent anti-oxidant).

Table 4 sets out the results obtained, which are displayed in FIG. 4: the columns 1-27 of FIG. 4 concern the same Bitumen Sample/Additive Compositions as in FIG. 3 (see above), but at a higher Additive Composition concentration than in FIG. 3.

The Bitumen Samples 1-3 comprising an increased concentration of the Additive Compositions 1 and 2 resulted in a further reduction in the impact of both short- and long-term ageing, compared to that observed with Bitumen Samples 1-3 with a lower concentration of the Additive Composition.

TABLE 1

The variability in the levels of resistance to short-term ageing of different bitumens provided to them by different individual additives

| | Bitumen only | Bitumen + Tris (2,4-di tert butyl phenyl phosphite) | Bitumen + Irganox FL 802 | Bitumen + epoxidised soyabean oil | Bitumen + tris phenyl phosphite |
|---|---|---|---|---|---|
| Bitumen 1 | | | | | |
| Softening point (° C.) | 57.8 | 59.6 | 57.4 | 58.2 | 57.2 |
| Softening point after RTFOT (° C.) | 64.8 | 63.8 | 62.8 | 62.2 | 64.2 |
| Change in softening point after RTFOT (° C.) | 7 | 4.2 | 5.4 | 4 | 7 |
| G* increase after RTFOT (%) | 203 | 97 | 22 | 6 | 48 |
| Bitumen 2 | | | | | |
| Softening point (° C.) | 93.5 | 93 | 91 | 92 | 92 |
| Softening point after RTFOT (° C.) | 95 | 93.5 | 94 | 93.5 | 92.5 |
| Change in softening point after RTFOT (° C.) | 1.5 | 0.5 | 3 | 1.5 | 0.5 |
| G* increase after RTFOT (%) | 167 | 26 | 26 | 43 | 77 |
| Bitumen 3 | | | | | |
| Softening point (° C.) | 49 | 49.4 | 50 | 49.4 | 49.8 |
| Softening point after RTFOT (° C.) | 53.4 | 54.8 | 54.4 | 53 | 52.6 |
| Change in softening point after RTFOT (° C.) | 4.4 | 5.4 | 4.4 | 3.6 | 2.8 |
| G* increase after RTFOT (%) | 203 | 63 | 17 | 15 | 15 |

TABLE 2

Comparison of Additive Compositions 1 and 2
on the change of softening point and G* after RTFOT

|  | Bitumen only | Bitumen + Additive composition 1 | Bitumen + Additive composition 2 |
|---|---|---|---|
| Bitumen 1 | | | |
| Softening point (° C.) | 57.8 | 57.8 | 57.8 |
| Softening point after RTFOT (° C.) | 64.8 | 62.8 | 64 |
| Change in softening point after RTFOT (° C.) | 7 | 4.8 | 6.2 |
| G* increase after RTFOT (%) | 203 | 104 | 93 |
| Bitumen 2 | | | |
| Softening point (° C.) | 93.5 | 91 | 91.5 |
| Softening point after RTFOT (° C.) | 95 | 91.5 | 92 |
| Change in softening point after RTFOT (° C.) | 1.5 | 0.5 | 0.5 |
| G* increase after RTFOT (%) | 167 | 82 | 123 |
| Bitumen 3 | | | |
| Softening point (° C.) | 49 | 48.8 | 49.8 |
| Softening point after RTFOT (° C.) | 53.4 | 52.8 | 52.8 |
| Change in softening point after RTFOT (° C.) | 4.4 | 4 | 3 |
| G* increase after RTFOT (%) | 203 | 156 | 44 |

TABLE 3

Comparison of Additive Compositions 1 and 2
on the change of G* after RTFOT and PAV cycles

|  | Bitumen only | Bitumen + Additive composition 1 | Bitumen + Additive composition 2 |
|---|---|---|---|
| Bitumen 1 | | | |
| Stiffness increase after RTFOT (%) | 203 | 104 | 93 |
| Stiffness increase after 1 cycle of the PAV (%) | 511 | 326 | 351 |
| Stiffness increase after 2 cycles of the PAV (%) | 725 | 435 | 436 |
| Bitumen 2 | | | |
| Stiffness increase after RTFOT (%) | 167 | 82 | 123 |
| Stiffness increase after 1 cycle of the PAV (%) | 312 | 158 | 205 |
| Stiffness increase after 2 cycles of the PAV (%) | 690 | 331 | 306 |
| Bitumen 3 | | | |
| Stiffness increase after RTFOT (%) | 203 | 156 | 44 |
| Stiffness increase after 1 cycle of the PAV (%) | 630 | 419 | 199 |
| Stiffness increase after 2 cycles of the PAV (%) | 859 | 617 | 510 |

TABLE 4

Effect of higher concentration of Additive Compositions 1 and 2
on the change of G* after RTFOT and PAV cycles

|  | Bitumen only | Bitumen + Additive composition 1 | Bitumen + Additive composition 2 |
|---|---|---|---|
| Bitumen 1 | | | |
| Stiffness increase after RTFOT (%) | 203 | 42 | 56 |
| Stiffness increase after 1 cycle of the PAV (%) | 511 | 263 | 250 |
| Stiffness increase after 2 cycles of the PAV (%) | 725 | 350 | 415 |
| Bitumen 2 | | | |
| Stiffness increase after RTFOT (%) | 167 | 35 | 21 |
| Stiffness increase after 1 cycle of the PAV (%) | 312 | 160 | 129 |
| Stiffness increase after 2 cycles of the PAV (%) | 690 | 204 | 208 |

TABLE 4-continued

| | Bitumen only | Bitumen + Additive composition 1 | Bitumen + Additive composition 2 |
|---|---|---|---|
| Effect of higher concentration of Additive Compositions 1 and 2 on the change of G* after RTFOT and PAV cycles | | | |
| Bitumen 3 | | | |
| Stiffness increase after RTFOT (%) | 203 | 29 | 6 |
| Stiffness increase after 1 cycle of the PAV (%) | 630 | 204 | 174 |
| Stiffness increase after 2 cycles of the PAV (%) | 859 | 415 | 299 |

We claim:

1. A bituminous composition comprising primary anti-oxidants and a secondary anti-oxidant, wherein the primary anti-oxidants are a phenyl phosphite and 3,3'-thiodipropionic acid dioctadecylester; and wherein the secondary anti-oxidant is epoxidized soybean oil; and wherein each of the primary anti-oxidants and the secondary anti-oxidant is present at range of from 0.05% w/w to 2% w/w with respect to the bituminous composition.

2. The bituminous composition according to claim 1, wherein the phenyl phosphite is selected from tris (2,4-ditert butyl) phenyl phosphite and tris phenyl phosphite.

3. The bituminous composition according to claim 1, wherein each of the primary anti-oxidants and the secondary anti-oxidant is present at range of from 0.15% w/w to 1.75% w/w with respect to the bituminous composition.

4. An asphalt composition comprising the bituminous composition of claim 1.

* * * * *